United States Patent [19]

Cramer

[11] Patent Number: 4,616,797
[45] Date of Patent: Oct. 14, 1986

[54] ADJUSTABLE SUPPORT ASSEMBLY

[75] Inventor: Mina M. Cramer, Montrose, Pa.

[73] Assignee: Mina Manufacturing, Inc., Enwell, N.Y.

[21] Appl. No.: 640,192

[22] Filed: Aug. 13, 1984

[51] Int. Cl.[4] ............................................. A47B 96/06
[52] U.S. Cl. .................................... 248/230; 24/514; 248/229; 248/231.5
[58] Field of Search ................ 248/230, 231.1, 225.31, 248/229, 316.1, 68.1, 340, 74.5, 231.5, 228, 231.6, 231.4, 72; 292/95, 101, 105

[56] References Cited

U.S. PATENT DOCUMENTS

| | | | |
|---|---|---|---|
| 1,000,389 | 8/1911 | Ette | 248/228 X |
| 1,777,884 | 10/1930 | Horix | 248/230 |
| 1,789,619 | 1/1931 | Dood | 292/101 |
| 2,469,079 | 5/1949 | Rosenbloom . | |
| 2,561,532 | 7/1951 | Lux . | |
| 2,673,771 | 3/1954 | Krewson . | |
| 2,756,955 | 7/1953 | Chadowski et al. . | |
| 2,934,803 | 5/1960 | Allen | 24/514 X |
| 3,318,457 | 5/1967 | Krasnoff . | |
| 3,530,996 | 9/1970 | Schaffer | 248/230 X |
| 3,531,071 | 9/1970 | Kubli | 248/68.1 |
| 3,902,931 | 9/1975 | Danciger et al. . | |

FOREIGN PATENT DOCUMENTS 0109016 7/1966 Norway ............................ 248/230

Primary Examiner—Ramon O. Ramirez
Attorney, Agent, or Firm—Panitch Schwarze Jacobs and Nadel

[57] ABSTRACT

An adjustable support assembly adapted for being releasably secured to an elongated support member comprises a clamp body member having a first lateral side for engaging the surface of the support member and a pair of pin members secured to and extending outwardly from the first lateral side of the body member. The pin members are generally parallel and spaced a distance greater than the width of the support member. The body member with the two pin members form a structure which is generally U-shaped in cross section for receiving the support member. An arm member is pivotally attached to one of the pin members to permit the other end of the arm member to engage the other pin member. Locking means are provided for retaining the other end of the arm into engagement with the pin member and for urging the arm member into clamping engagement with the support member.

13 Claims, 9 Drawing Figures

U.S. Patent    Oct. 14, 1986    4,616,797
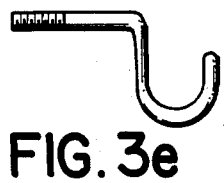
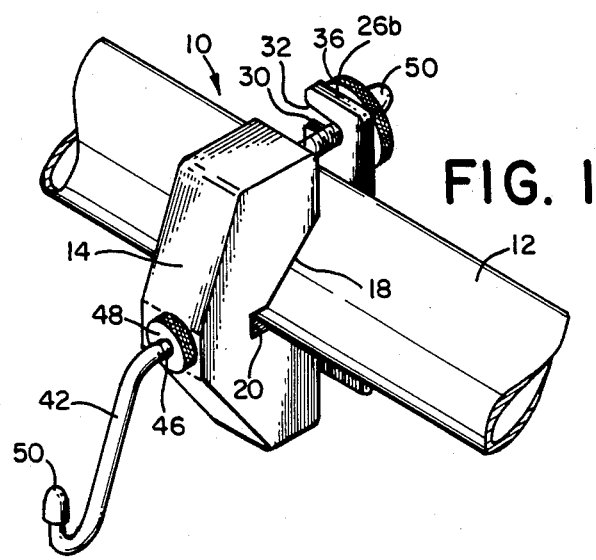
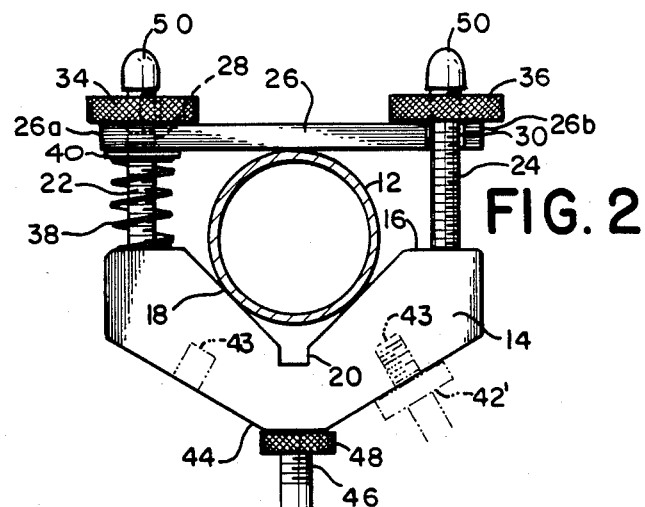
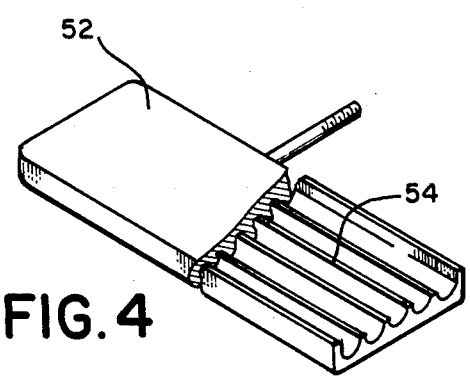
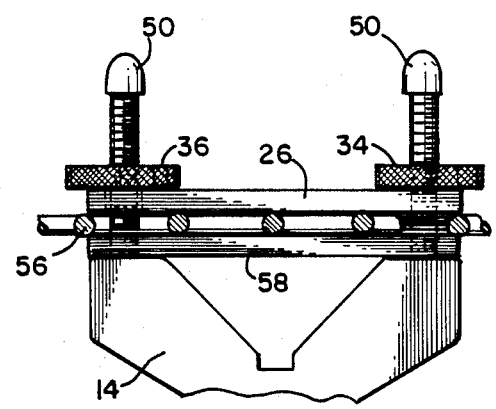

ADJUSTABLE SUPPORT ASSEMBLY

BACKGROUND OF THE INVENTION

The present invention relates generally to an adjustable support assembly and, more particularly, to such a support assembly which is adapted for being releasably secured to an elongated support member such as a pole.

The support assembly of the present invention was initially developed for use in the medical field and is particularly adapted for attachment to an IV pole, wheelchair, geri-chair, stretcher or the like to support various medical and medical related equipment associated with a patient in order to facilitate movement of the patient. The medical equipment which may be supported may include such things as urinary drainage bags, multiple intravenous solutions, naso-gastric or chest tubings, urostomy drainage bags, lightweight monitoring equipment, tubing and wiring, and any other type of equipment or apparatus which must be secured to the patient or must otherwise accompany the patient during movement. In the past, it was necessary for a nurse, nurse's aid, or other hospital personnel to physically accompany the patient during movement solely for the purpose of supporting and transporting such medical apparatus and/or equipment. It was particularly critical that certain medical apparatus and equipment, such as IV tubing, be adequately supported at a predetermined height in order to promote the proper flow of the IV solution into the patient and to preclude the patient from tripping over the equipment, possibly resulting in damage to the tubing and/or inadvertent separation of the tubing from the patient.

In addition to such medical equipment being hand carried by hospital personnel, often such equipment would be secured to the patient's clothing or other structures utilizing pins or tape, or would be positioned on the lap of the patient. Such makeshift methods are unreliable at best and, under some circumstances, can result in a great potential for injury or infection of the patient.

The present invention provides an infinitely adjustable support assembly adapted for being releasably secured to an elongated support member, such as an IV pole, wheelchair or the like, and includes means for conveniently supporting medical apparatus and equipment to facilitate movement of a patient.

While the present invention was initially developed for usage in the medical field, it will be readily apparent and should be appreciated by those skilled in the art that it could also be utilized in many other fields. For example, the adjustable support assembly could be secured to a camera tripod for supporting a flash attachment and/or other equipment utilized by a photographer. Alternatively, the adjustable support assembly could be secured to a tent pole for supporting a hanging lantern or any other type of camping equipment.

SUMMARY OF THE INVENTION

Briefly stated, the present invention comprises an adjustable support assembly which is adapted for being releasably secured to an elongated support member. The support assembly comprises a clamp body member having a first lateral side for engaging the surface of the support member and a pair of pin members secured to and extending outwardly from the first lateral side of the body member. The body member, at least across the first lateral side, is of a width greater than the width of the support member and the pin members are generally parallel and spaced a distance greater than the width of the support member. The length of the pin members extending beyond the body member is greater than the depth of the support member. The body member, in combination with the two pin members, forms a structure which is generally U-shaped in cross section for receiving the support member. An arm member, having a length at least as long as the distance between the two pin members, is also provided. One end of the arm member is pivotally attached to one of the pin members and the other end of the arm member is adapted for engagement with the other pin member. Locking means are provided for retaining the other end of the arm member into engagement with the other pin member and for urging the arm member into clamping engagement with the support member. In operation, the arm member is pivoted away from the other pin member to permit the support member to be received within the U-shaped structure and then is pivoted into engagement with the other pin member to enclose the support member. The locking means is then operated to urge the arm member into clamping engagement with the support member to secure the support assembly to the support member. A seat may be provided on the first lateral side of the body member between the two pin members for engaging the surface of the support member. In the preferred embodiment, adjustable hook means are secured to a second lateral side of the body member for securing apparatus to the support assembly.

BRIEF DESCRIPTION OF THE DRAWING

The foregoing summary, as well as the following detailed description will be better understood when read in conjunction with the appended drawing. For the purpose of illustrating the invention, there is shown in the drawing embodiments which are presently preferred, it being understood, however, that this invention is not limited to the precise arrangements and instrumentalities shown. In the drawing:

FIG. 1 is a perspective view of an adjustable support assembly in accordance with the present invention;

FIG. 2 is an enlarged bottom plan view of a slightly different version of the adjustable support assembly of FIG. 1;

FIGS. 3a, 3b, 3c, 3d and 3e show different types of hooks which may be secured to the adjustable support assembly of FIG. 1;

FIGS. 4 is a reduced size perspective view of a shelf apparatus which may be employed in conjunction with the support apparatus of FIG. 1; and FIG. 5 is a reduced size top plan view of a portion of the support assembly of FIG. 2 illustrating a slight modification thereof.

DESCRIPTION OF PREFERRED EMBODIMENTS

Referring in detail to the drawing, wherein like numerals indicate like elements throughout, there is shown in FIG. 1 a perspective view of a preferred embodiment of an adjustable support assembly, shown generally as 10, in accordance with the present invention. The support assembly 10 of FIG. 1 is shown as being releasably secured to an elongated support member, in the present embodiment, a generally cylindrical tubular pole 12 which is generally horizontally oriented. It should be understood, however, that the support assembly 10 of the present embodiment could also be secured to a support member which may be oriented in any other manner, such as vertically oriented, or oriented at some angle between the vertical and the horizontal. Likewise, although the support member as shown in FIG. 1 is a cylindrical tubular pole 12, it will be appreciated by those skilled in the art that the support assembly 10 could likewise be secured to a support member having any other cross section configuration, such as triangular, rectangular, square, elliptical, or the like. In addition, the support assembly 10 could be suitably sized to correspond to a support member of any given cross sectional dimensions.

As best seen in FIGS. 1 and 2, the support assembly 10 is comprised of a clamp body member 14. The clamp body member 14 has a first lateral side 16 for engaging the surface of the support member or pole 12. In the present embodiment, the body member 14 further includes a seat in the form of a notched portion or notch 18 which is generally V-shaped in cross section. It is the seat or notch 18 which, in the present embodiment, actually engages the curved surface of the pole 12. It will be appreciate by those skilled in the art that the notch 18 could be of any other suitable configuration such as U-shaped in cross section, square in cross section, or the like, in order to provide a seat for engaging a support member of the same or a different configuration.

Notch 18 includes a squared sub-notch 20 at the bight of the V-shaped area. The sub-notch 20 could be employed for receiving the surface of a support member of a different shape. For example, if the support member was square in cross section, one of the corners could be placed within the sub-notch 20.

The clamp body member 14 is fabricated of a generally rigid, preferably lightweight material such as wood, aluminum, metal or a polymeric material, for example, polyvinylchloride. The body member may be made by machining or otherwise processing a block of the material or by casting or molding the material, utilizing a known process or technique such as injection molding. The width of the body member 14, at least across the first lateral side 16, must be at least slightly greater than the corresponding width or diameter of the support member or pole 12 to which the support assembly 10 is to be secured. The other dimensions and overall external shape of the body member may vary, depending upon the particular application. In the present embodiment, the body member 14 is shown as being generally V-shaped in cross section. It should be understood and appreciated that the invention is not limited to such a shape and that any other suitable configuration could be employed in connection with a particular application.

A pair of pin members 22 and 24 are secured at one end to the clamp body member 14 and extend outwardly from the first lateral side 16. The pin members 22 and 24 are generally parallel and are positioned one on each side of the seat or notch 18 so that the distance between the pin members is at least slightly greater than the width of the support member or pole 12. The pin members 22 and 24 cooperate with the body member 14 to form a generally unitary structure, which is generally U-shaped in cross section, for receiving and engaging the support member 12. The length of the pin members 22 and 24 extending beyond the body member 14 in combination with the depth of the seat or notch 18 is at least slightly greater than the depth of the support member 12. It will be appreciated by those skilled in the art that the width of the body member 14 and the length of the pin members 22 and 24 may vary in accordance with the dimensions of the support member 12.

The pin members 22 and 24 could be formed of any rigid, high-strength material. In the presently preferred embodiment, the pin member 22 and 24 are generally cylindrical and are fabricated of steel. For purposes which will hereinafter become apparent, at least a portion of each of the pin members 22 and 24 proximate the distal end is threaded and preferably the entire length of each of the pin members 22 and 24 is threaded.

The support assembly 10 further includes an arm member 26 which is adapted to cooperate with the body member 14 and the pin members 22 and 24 for securing the support assembly 10 to the support member 12. The arm member 26 in the present embodiment is generally flat and elongated and is at least as long as the distance between the two pin members 22 and 24. The arm member 26 may be fabricated of the same material as the body member 14 or any other generally rigid, preferably lightweight material.

A generally circular opening 28 (shown in phantom) extends through the arm member 26 proximate one end 26a. One pin member 22 extends through the arm member opening for pivotally attaching the arm member 26 to the pin member 22 to permit the arm member to pivot generally normal to the axis of the pin member 22. The other end of the arm member 26b is adapted for engaging the other pin member 24. A generally U-shaped notch 30 is provided proximate the other arm member end 26b. The notch 30 is appropriately sized and positioned to conveniently receive the other pin member 24 as shown in FIG. 2. In order to facilitate entry of the other pin member 24 into the notch 30 the open end of the notch includes an enlarged mouth portion 32.

Locking means are provided for retaining the arm member 26 on the pin member 22 and for urging the arm member 26 into clamping engagement with the support member 12. In the presently preferred embodiment, the locking means comprises a pair of nut-like members 34 and 36 having central openings with interior threads corresponding to the threads on the pin members 22 and 24. Preferably, the nut-like members 32 and 34 are generally cylindrical with knurled outer surfaces as shown to facilitate convenient gripping for rotational movement upon the pin members 22 and 24. The nut-like members 32 may be fabricated of any lightweight rigid material, for example, steel.

The support assembly further includes resilient means for urging the arm member 26 away from the body member 14 and into engagement with the nut-like members 34 and 36. In this manner, the support assembly 10 can be conveniently attached to the support member 12 utilizing only one hand. In the presently preferred embodiment, the resilient means comprises a single compressed coil spring member 38 surrounding pin member 22 and positioned between the body member 14 and the arm member 26. An annular disk-like member, such as a metal washer 40, may be installed between the spring member 38 and the arm member 26 in order to facilitate pivotal movement of the arm member 26 about the pin member 22.

In utilizing the support member 10, the arm member 26 is pivoted away from pin member 24 to permit the support member 12 to be received within the U-shaped structure formed by the body member 14 and the two pin members 22 and 24. The support member 12 is received within the seat or notch 18 as shown in FIGS. 1 and 2 at the desired location along the support member 12. Thereafter, the arm member 26 is pivoted so that the notch 30 engages pin member 24. The coil spring member 38 urges the arm member 26 outwardly so that it pivots on the other side of the support member 12. The two nut-like members 34 and 36 may then be rotated to urge the arm member 26 into engagement with the support member 12 as shown in FIG. 2. Further tightening of the nut-like members 34 and 36 tightly clamps the support assembly to the support member 12.

It will be appreciated that the support member 10 can be releasably secured to a support member 12 having virtually any dimensions and can be positioned at virtually any location along the length of the support member. The support assembly 10 is strong and lightweight and can be conveniently positioned and clamped onto the support member 12 utilizing only one hand. The support assembly 10 can be quickly removed or adjusted to a different location along the support member 12. As previously discussed, the support assembly can be secured to a support member 12 which is positioned in virtually any orientation.

Although it will be appreciated by those skilled in the art that some apparatus could be conveniently supported by the support assembly 10 as thus far described, the support assembly 10 of the preferred embodiment further includes hook means attached to the body member 14 for securing apparatus thereto. In the presently preferred embodiment, the hook means comprises a single elongated hook member 42 which is attached to a second lateral side 44 of the body member 14. One end of the hook member 42 includes threads 46 which engage complementary threads (not shown) within an opening in the body member 14 for holding the hook member 42 in place. Locking means, in the presently preferred embodiment a nut-like member 48 similar in structure to nut-like members 34 and 36, threadingly engages the hook member threads 46 and functions as a lock nut to tightly secure the hook member 42 to the body member 14. The hook member 42 may be oriented in any desired manner by simply loosening the nut-like member 48 and turning it with respect to the body member 14. In this manner, the hook member 42 may be oriented to serve a particular supporting purpose without regard to the orientation of the body member 14 which may be oriented to cooperate with the support member 12. Once the hook member 42 is oriented as desired, the nut-like member 48 may be tightened upon the hook member threads 46 to lock the hook member 42 in place in the desired orientation. Once the hook member 42 is secured to the body member 14 the apparatus or equipment to be supported may be secured to the hook member 42.

The support assembly may include more than one hook member for a particular application. As shown in FIG. 2, the body member 14 may contain additional threaded openings 43 (only two of which are shown in phantom) to which may be attached additional hook members 42' (only one of which is shown in phantom). Additional hook members (not shown) may be secured to the top and/or bottom or end surfaces of the body member 14 if desired.

As presently preferred, the distal ends of each of the pin members 22 and 24, as well as the distal end of the hook member 42 is covered by protection means, preferably a cap 50 formed of a soft material such as rubber or vinyl. The cap 50 in addition to keeping the distal ends of the pin members 22 and 24 and hook member 42 clean, serves to prevent potential injury to users of the support assembly 10 and to prevent the inadvertent removal of the nut-like members 34 and 36.

Although the adjustable support assembly 10 is preferably employed with an elongated hook member 42 of the type shown in FIGS. 1 and 2, it will be appreciated by those skilled in the art that other types of hook means may alternatively be employed in particular applications. FIGS. 3a, 3b, 3c, 3d and 3e illustrate but five of the different types of hook means which may alternatively be employed with the support assembly 10. Each of the hooks shown have threaded ends for engagement with the threaded openings on the body member 14. It will be appreciated by those skilled in the art that any other type of hook means may alternatively be employed.

In addition to hook means, shelf means may alternatively be secured to the support assembly 10. The shelf means could comprise a generally flat shelf such as shelf 52 (FIG. 4) or may comprise a shelf having a plurality of grooves embedded in the surface thereof, such as shelf 54 (FIG. 4). Any other suitable type of shelf may alternatively be employed. The shelf means also include a threaded member for engagement with the threaded body member openings. Shelves 52 and 54 may be utilized for supporting instrumentation or equipment or the like.

FIG. 5 illustrates an alternate embodiment of the support assembly for use in a specialized application such as in connection with an animal cage shown in section as 56. The support assembly 10 of FIG. 5 includes a second arm member 58 which includes circular openings at both ends for installation over the two pin members 22 and 24 as shown. The support assembly 10 of FIG. 5 is secured to the animal cage 56 in substantially the same manner as described above in connection with the embodiment of FIGS. 1 and 2.

From the foregoing description, it can be seen that the present invention comprises an adjustable support assembly for being releasably secured to an elongated support member and which may utilized in a variety of applications. It will be recognized by those skilled in the art that changes may be made to the above-described embodiments of the invention without departing from the broad inventive concepts thereof. It is understood, therefore, that this invention is not limited to the particular embodiments disclosed, but it is intended to cover any modifications which are within the scope and spirit of the invention as defined by the dependent claims.

I claim:

1. An adjustable support assembly adapted for being releasably secured to an elongated support member comprising:
   a clamp body member having a first lateral side for engaging the surface of the support member, the width of the body member, at least across the first lateral side, being greater than the width of the support member;
   a pair of generally cylindrical pin members, secured to and extending outwardly from the first lateral side of the body member, the pin members being at least partially threaded and being generally parallel and spaced a distance greater than the width of the support member, the length of the pin members extending beyond the body member being greater than the depth of the support member, the body member with the two pin members forming a structure generally U-shaped in cross-section for receiving the support member;

an arm member having a length at least as long as the distance between the two pin members, one end of the arm member including a circular opening extending therethrough proximate the one end, one pin member extending through the opening for attaching the arm member to permit the arm member to pivot about the one pin member generally normal to the axis of the one pin member, the other end of the arm member being adapted for engagement with the other pin member; and locking means comprised of a nut-like member for engaging the threaded portion of the other pin member for retaining the other end of the arm member into engagement with the other pin member and for urging the arm member into clamping engagement with the support member whereby the arm member may be pivoted away from the other pin member to permit the support member to be received within the U-shaped structure and then pivoted into engagement with the other pin member to enclose the support member within the support assembly, the locking means being operated to urge the arm member into clamping engagement with the support member to secure the support assembly to the support member.

2. The support assembly as recited in claim 1 wherein the clamp body member includes a seat on the first lateral side between the two pin members, the seat engaging the surface of the support member.

3. The support assembly as recited in claim 2 wherein the clamp body seat is generally V-shaped in cross section.

4. The support assembly as recited in claim 1 wherein a nut-like member engages the threaded portion of the one pin member for retaining the arm member thereon.

5. The support assembly as recited in claim 4 and further including resilient means for urging the arm member away from the body member and into engagement with the nut-like members.

6. The support assembly as recited in claim 5 wherein the resilient means comprises a compressed coil spring member surrounding the one pin member and positioned between the body member and the arm member.

7. The support assembly as recited in claim 6 wherein the arm member includes a notch proximate the other end thereof, the notch being sized to receive the other pin member.

8. The support assembly as recited in claim 7 wherein the notch includes an enlarged mouth portion for engaging the other pin member.

9. The support assembly as recited in claim 1 and further including hook means attached to the body member for securing apparatus to the support assembly.

10. The support assembly as recited in claim 9 wherein the orientation of the hook means is adjustable with respect to the body member.

11. The support assembly as recited in claim 10 wherein the hook means is attached to a second lateral side of the body member opposite to the first lateral side.

12. The support assembly as recited in claim 9 wherein the hook means comprises at least two hooks.

13. The support assembly as recited in claims 1 and further including shelf means attached to the body member for receiving and supporting apparatus.

* * * * *